United States Patent
Hattori

(10) Patent No.: US 7,680,396 B2
(45) Date of Patent: Mar. 16, 2010

(54) REPRODUCING SYSTEM AND REPRODUCTION METHOD, AND DATA TRANSMISSION DEVICE AND DATA TRANSMISSION METHOD

(75) Inventor: Masakazu Hattori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1765 days.

(21) Appl. No.: 10/203,147

(22) PCT Filed: Dec. 6, 2001

(86) PCT No.: PCT/JP01/10700

§ 371 (c)(1),
(2), (4) Date: Nov. 19, 2002

(87) PCT Pub. No.: WO02/47087

PCT Pub. Date: Jun. 13, 2002

(65) Prior Publication Data

US 2003/0118158 A1 Jun. 26, 2003

(30) Foreign Application Priority Data

Dec. 7, 2000 (JP) ............................. 2000-373007

(51) Int. Cl.
*H04N 5/781* (2006.01)
(52) U.S. Cl. .................. 386/124; 386/131; 386/109; 386/68
(58) Field of Classification Search .......... 386/124–126
See application file for complete search history.

(56) References Cited

U.S. PATENT DOCUMENTS 6,148,138 A * 11/2000 Sawabe et al. ................ 386/69

(Continued)

FOREIGN PATENT DOCUMENTS

EP 0 457 492 A2 11/1991

(Continued)

OTHER PUBLICATIONS

Schulzrinne et al., "RTP: A Transport Protocol for Real-Time Applications; draft-letf-avt-rtp-new-08.txt;" IETF Standard-Working-Draft, Internet Engineering Task Force, IETF, Ch, vo. avt, No. 8, Jul. 14, 2000.

(Continued)

*Primary Examiner*—Thai Tran
*Assistant Examiner*—Helen Shibru
(74) *Attorney, Agent, or Firm*—Finnegan, Henderson, Farabow, Garrett & Dunner, L.L.P.

(57) ABSTRACT

A reproduction player (10) comprising a packet processing unit (14) for allowing A/V data reproduced from a recording medium by a disc reproducing unit (12) and an encoder (13) to be packet data so that communication packet is provided, and for inserting additional information indicating operating state of the reproduction player (10) into the communication packet, and a remocon (20) comprising a packet processing unit (25) for taking out additional information along with A/V data from communication packet that a receiving unit (24) has received, an output unit (21) for externally outputting music and/or image on the basis of the A/V data, and a display unit (22) for displaying operating state of the reproduction player (10) on the basis of the additional information are used to constitute a reproducing system which reproduces music and/or video data. User can recognize, on the real time basis, the state of the unit of the transmitting side which reproduces A/V data at an remote output equipment.

15 Claims, 4 Drawing Sheets

U.S. PATENT DOCUMENTS

| | | | |
|---|---|---|---|
| 6,608,962 B1* | 8/2003 | Lee | 386/46 |
| 6,687,308 B1* | 2/2004 | Inose et al. | 375/260 |
| 7,266,700 B2* | 9/2007 | Tsutsui et al. | 713/182 |
| 2004/0093618 A1* | 5/2004 | Baldwin et al. | 725/101 |
| 2004/0175139 A1* | 9/2004 | Tsumagari et al. | 386/95 |
| 2008/0008457 A1* | 1/2008 | Ando et al. | 386/126 |
| 2008/0253738 A1* | 10/2008 | Yamauchi et al. | 386/95 |

FOREIGN PATENT DOCUMENTS

| | | | |
|---|---|---|---|
| JP | 04-019890 | | 1/1992 |
| JP | 09-244975 | | 9/1997 |
| JP | 11-98566 | | 4/1999 |
| JP | 11-098566 | | 4/1999 |
| JP | 11-213639 | * | 6/1999 |
| JP | 11-213639 | | 8/1999 |
| JP | 2000-209280 | | 7/2000 |
| WO | WO 99/09718 | | 2/1999 |

OTHER PUBLICATIONS

Japanese Office Action Issued in Counterpart Application No. 2000-373007 (3 pages).

* cited by examiner

REPRODUCING SYSTEM AND REPRODUCTION METHOD, AND DATA TRANSMISSION DEVICE AND DATA TRANSMISSION METHOD

TECHNICAL FIELD

This invention relates to a reproducing system and a reproducing method for reproducing music and/or video data, and a data transmitting apparatus and a data transmitting method for transmitting music and/or video data, and more particularly to a reproducing system comprising a unit for reproducing music and/or data and a unit for externally outputting music and/or image, a reproducing method in such a reproducing system, and a data transmitting apparatus and a data transmitting method for transmitting music and/or video data to a unit for externally outputting music and image.

BACKGROUND ART

There are systems for carrying out transmission/reception of data of audio and video (hereinafter referred to as A/V) (hereinafter referred to as A/V data) between equipments linked by digital network to reproduce such data on the real time basis. The system for manipulating A/V equipment existing at a remote place to receive contents by monitor or speaker near at hand to reproduce it is an example of the systems as described above. As an equipment which manipulates such A/V equipment existing at a remote place (hereinafter referred to as remote output equipment), remote controller having speaker or earphone, etc. is mentioned. It should be noted that there are cases of only audio data, or cases of only video data as data caused to undergo transmission/reception.

In the case where packet communication is utilized for communication, the transmitting side encodes A/V data to divide it into frames. Further, the transmitting side supplements headers for exchanging data on network to divided individual frames to transmit them as communication packet. In correspondence therewith, the receiving side removes the headers from the received communication packet to decode the removed remaining data portion to reproduce it. By such a series of processing, at the receiving side, it is possible to reproduce audio and video data on the basis of A/V data reproduced at the transmitting side.

Meanwhile, in such system, there are instances where information except for A/V data is also caused to undergo transmission/reception together. For example, there is the case where user desires to recognize the state of player by remote output equipment at a remote position while reproducing music by player.

Here, as the player, there is mentioned a disc recording and/or reproducing apparatus having a function to reproduce recording medium, e.g., so-called CD (Compact Disc), DVD (Digital Versatile Disc) or MD (Mini Disc), etc. In addition, as the state that user desires to know, there are mentioned title of tune that player is reproducing, playing remaining time of tune and/or internal state of player (e.g., playback (reproduction), double speed playback (reproduction), stop, temporary stop, etc.).

However, ordinarily, this function is available only in the system where communication except for A/V data can be carried out in parallel. In this case, mechanism for carrying out transmission/reception of information except for A/V data is independently defined to carry out communication in accordance with the mechanism. Further, it is necessary to mount two communication protocols into the equipment.

For this reason, players designed in correspondence with only communication protocol of A/V data in which such a definition is not carried out in advance cannot send, on the real time basis, information such as title of tune being reproduced, playing remaining time of tune and/or internal state of player, etc. to remote output equipment.

DISCLOSURE OF THE INVENTION

An object of this invention is to provide a reproducing system, a reproducing method, a data transmitting apparatus and a data transmitting method which can recognize, at remote output equipment, state of apparatus of the transmitting side which reproduces A/V data on the real time basis.

In order to solve the above-described problems, a reproducing system according to this invention comprises a reproducing unit including packet data generating means for allowing music and/or video data reproduced from a recording medium to be packet data so that communication packet is provided, and for inserting additional information into the communication packet, and transmitting means for transmitting the communication packet outputted from the packet data generating means onto communication path. In addition, the reproducing system comprises an external output unit including receiving means for receiving communication packet on communication path, data taking-out means for taking out additional information along with music and/or video data from the communication packet that the receiving means has received, external output means for externally outputting music and/or image on the basis of the music and/or video data that the data taking-out means has taken out, and operating means operative on the basis of the additional information that the data taking-out means has taken out.

In reproducing system having such configuration, the reproducing unit is operative so that when music and/or video data reproduced from recording medium are caused to be packet data so that communication packet is provided, additional information is inserted into communication packet by the packet data generating means, and communication packet outputted from the packet data generating means is transmitted onto communication path by the transmitting means. The external output unit is operative so that additional information is taken out by the data taking-out means together with music and/or video data from communication packet that the receiving means has received from on communication path, the external output means externally outputs music and/or image on the basis of music and/or video data that the data taking-out means has taken out, and the operating means becomes operative on the basis of additional information that the data taking-out means has taken out.

Namely, the reproducing system includes additional information into communication packet used for transmission of music and/or video data from the reproducing unit during reproduction to thereby allow the operating means of the external output unit to be operative on the basis of additional information within communication packet transmitted during reproduction.

Moreover, in order to solve the above-described problems, a reproducing method according to this invention includes a reproduction transmitting step of reproducing music and/or video data from a recording medium to allow the music and/or video data to be packet data so that communication packet is provided, and of inserting additional information into the communication packet to transmit the communication packet onto communication path, and an external output step of receiving the communication packet transmitted onto the communication path at the reproduction transmitting step to take out additional information together with the music and/or video data from the received communication packet to externally output music and/or image on the basis of the music and/or video data which has been taken out, and of operating operating means on the basis of the additional information.

In such reproducing method, additional information is included into communication packet used for transmission of music and/or video data from the reproducing unit during reproduction to thereby operate the operating means of the external output unit on the basis of additional information within the communication packet transmitted during reproduction.

Further, in order to solve the above-described problems, a data transmitting apparatus according to this invention comprises packet data generating means for allowing music and/or video data reproduced from a recording medium to be packet data so that communication packet is provided and for inserting additional information into the communication packet, and transmitting means for transmitting the communication packet outputted from the packet data generating means onto communication path.

The data transmitting apparatus having such configuration is operative so that when music and/or video data reproduced from the recording medium is caused to be packet data so that communication packet is provided, it inserts additional information into communication packet by the packet data generating means to transmit the communication packet outputted from the packet data generating means onto the communication path by the transmitting means.

Namely, the data transmitting apparatus transmits communication packet in the state where additional information is included into music and/or video data, and the external output unit externally outputs music and/or image on the basis of the transmitted music and/or video data, and operates the operating means on the basis of the additional information.

In addition, in order to solve the above-described problems, a data transmitting method according to this invention includes a packet data generation step of allowing music and/or video data reproduced from a recording medium to be packet data so that communication packet is provided, and of inserting additional information into the communication packet, and a transmitting step of transmitting the communication packet outputted at the packet data generation step onto transmission path.

By such data transmitting method, the data transmitting unit transmits communication packet in the state where additional information is included into music and/or video data, and the external output unit externally outputs music and/or image on the basis of transmitted music and/or video data, and operates operating means on the basis of the additional information.

Still further objects of this invention and more practical merits obtained by this invention will become more apparent from the description of the embodiment which will be given below.

BEST MODE FOR CARRYING OUT THE INVENTION

An embodiment of this invention will now be described in detail with reference to the attached drawings. In the embodiment shown here, this invention is applied to a reproducing system, particularly portable reproducing system comprising a reproduction player exclusive for reproduction, and a remote controller (hereinafter referred to as remocon) for carrying out remote control of this reproduction player by wireless.

Figure 1:
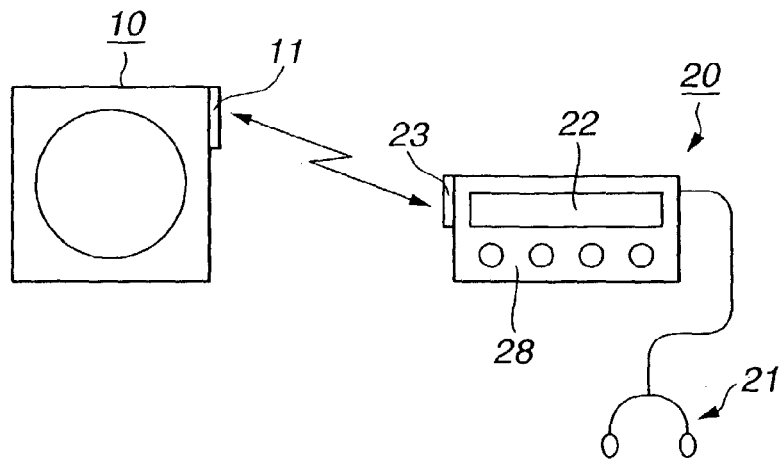
FIG. 1 is a view for explaining the configuration of a reproducing system shown as an embodiment of this invention.

The reproducing system shown as this embodiment comprises, as shown in FIG. 1, a reproduction player 10 and a remocon 20. The reproduction player 10 is constituted as a unit of the side where recording medium is loaded in this system. This reproduction player 10 is caused to be compact and portable. As a recording medium that this reproduction player 10 reproduces, there is mentioned a recording medium adapted so that music and/or video data (A/V data) is recorded. In more practical sense, there are mentioned a disc-shaped recording medium such as the so-called CD (Compact Disc), DVD (Digital Versatile Disc), or MD (Mini Disc), etc., a tape-shaped recording medium, and/or a semiconductor memory caused to be in substantially thin plate form, etc.

On the other hand, the remocon 20 has a function to carry out remote control of the reproduction player 10 by wireless, and has a function as an external output equipment which externally outputs music on the basis of music data, etc. reproduced at the reproduction player 10. In more practical sense, this remocon 20 comprises a headphone 21 as external output means. Thus, the remocon 20 constitutes headphone with remocon.

Namely, the above-described reproduction player 10 constitutes a portion for reproducing music data recorded with respect to recording medium, and this remocon 20 constitutes an output unit which outputs music on the basis of music data reproduced at the reproduction player 10.

Further, this remocon 20 comprises a display unit 22. The display unit 22 is, e.g., liquid crystal display unit. The remocon 20 can display various information on this display unit 22. As various information, there are mentioned information such as title of album, etc. For example, title name of such album is recorded with respect to recording medium as TOC (Table of Contents) data.

In addition, this remocon 20 comprises an antenna 23, and can transmit/receive, by wireless, various information including music data, etc. between the remocon 20 and the reproduction player 10 similarly comprising an antenna 11.

Here, as transmitting/receiving means by wireless carried out between equipments, there is mentioned the so-called Bluetooth, etc. Bluetooth is interface remarked in recent years as interface which permits digital wireless communication by wireless between plural equipments, It is to be noted that it is needless to say that wireless transmitting/receiving means is not limited to this Bluetooth in the embodiment of this invention.

As stated above, in the reproducing system comprising the reproduction player 10 and the remocon 20, the reproduction player 10 implements a predetermined processing such as Encode and/or conversion into communication packet data, etc. to music data reproduced from the recording medium to transmit the music data thus processed to the remocon 20 through the antenna 11 by wireless.

From the remocon 20, a control signal indicating that the reproduction player 10 starts reproduction of music data from the recording medium, etc. is transmitted. The remocon 20 receives data transmitted from the reproduction player 10 through the antenna 23 to implement a predetermined processing such as Decode, etc. to output it as music from the headphone 21.

The reproduction form in such music system is the same as the prior art one. However, the reproducing system to which this invention is applied is characterized in that the remocon 20 can further display information indicating the present operating state of the reproduction player 10, and/or information such as track No. of tune or title of tune that the reproduction player 10 is reproducing, or playing remaining time of tune, reproduction time, etc. (hereinafter referred to as tune reproduction information) on the display unit 22 on the real time basis. Here, as information indicating present operating state (hereinafter referred to as operating state information), there is mentioned internal state of the reproduction player 10 (e.g., playback (reproduction), double speed playback (reproduction), stop, temporary stop, etc.).

As stated above, the reproducing system to which this invention is applied includes data, etc. for displaying operating state on the display unit 22 into communication packet of music data always transmitted from the reproduction player 10 to the remocon 20 during reproduction of music, thereby permitting user to recognize operating state of the reproduction player 10 or reproduction state of tune at the remocon 20.

Namely, at the remocon 20, music data transmitted from the reproduction player 10 is outputted from the output unit 21 such as the headphone, and various information are displayed on the display unit 22 on the basis of other data included or added into communication packet of this music data.

Figure 2:
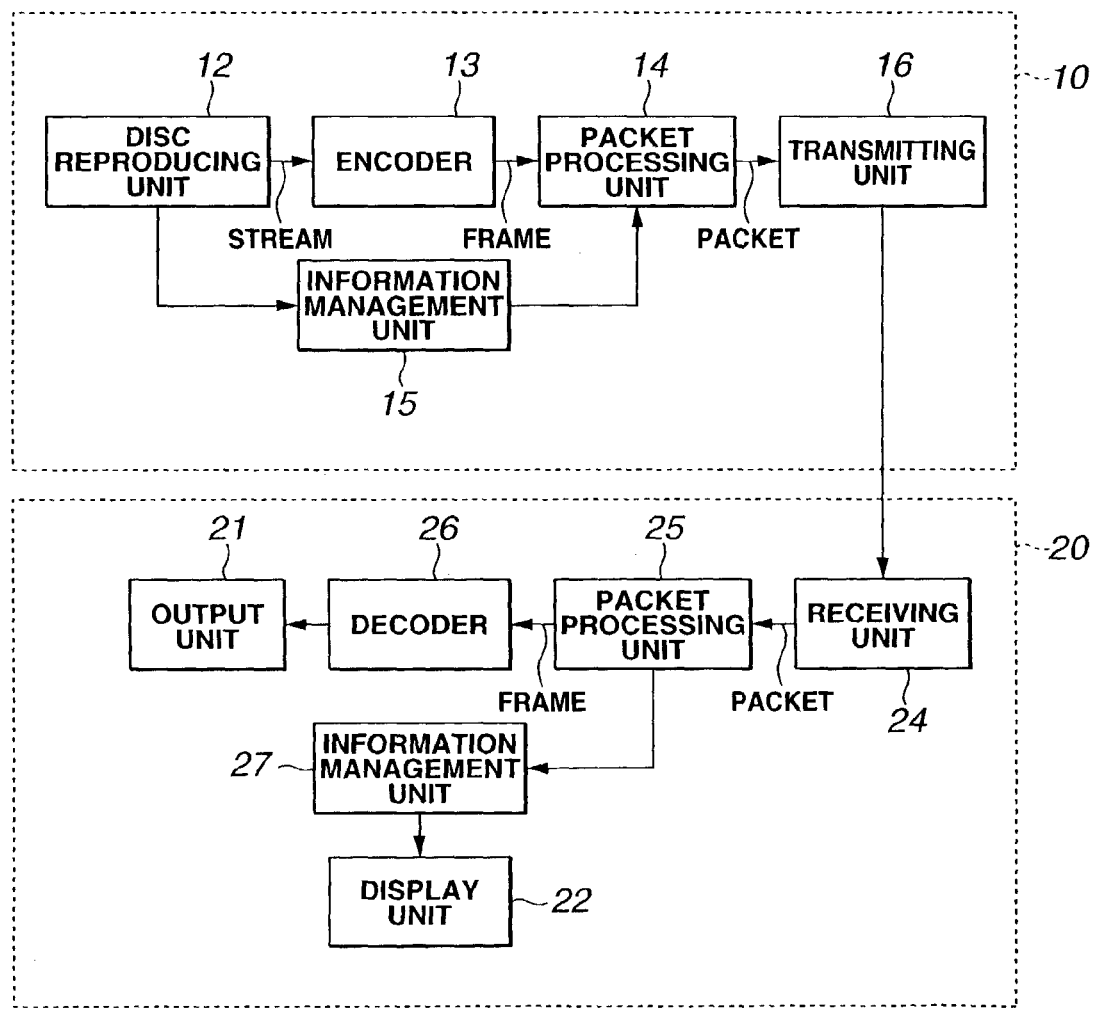
FIG. 2 is a block diagram showing the internal configuration of reproduction player and remocon of the reproducing system shown in FIG. 1.

The portion to which this invention is applied and in which this invention is realized will now be described in more practical sense. FIG. 2 shows a circuit configuration of the reproduction player 10 and the remocon 20.

Here, the reproduction player 10 comprises, as shown in FIG. 2, a disc reproducing unit 12, an encoder 13, a packet processing unit 14, an information management unit 15, and a transmitting unit 16. The reproduction player 10 comprises the disc reproducing unit 12, etc., and is the example constituted as player for reproduction of music data recorded on disc-shaped recording medium (hereinafter simply referred to as disc) such as CD, etc. On the other hand, the remocon 20 comprises, as shown in FIG. 2, a receiving unit 24, a packet processing unit 25, a decoder 26, an information management unit 27, output unit 21, and the above-described display unit 22.

In this reproduction player 10, the disc reproducing unit 12 and the encoder 13 constitute reproducing means for reproducing music and/or video data from the recording medium, the packet processing unit 14 constitutes packet data generating means adapted so that when such music and/or video data that reproducing means has reproduced is caused to be packet data so that communication packet is provided, it inserts additional information into communication packet, and the transmitting unit 16 constitutes transmitting means for transmitting communication packet outputted from the packet processing unit 14 onto communication path.

Further, at the remocon 20, the receiving unit 24 constitutes receiving means for receiving communication packet on the communication path, and the packet processing unit 25 functions as data taking-out means for taking out additional information along with music and/or video data from communication packet that the receiving unit 24 has received. In addition, the output unit 21 constitutes external output means for externally outputting music and/or image on the basis of music and/or video data that the packet processing unit 25 has taken out, and the display unit 22 constitutes operating means operative on the basis of additional information that the packet processing unit 25 has taken out.

Processing procedure until music is reproduced by the reproduction player 10 and music is externally outputted by the remocon 20 will be described below with respect to respective components of the reproduction player 10 and the remocon 20 shown as this embodiment.

In the reproduction player 10, the disc reproducing unit 12 reads out audio data from disc. Moreover, the disc reproducing unit 12 reads out TOC (Table of Contents) data from the disc. In the TOC data, there are included information relating to music recorded on the disc, e.g., album name, titles of respective tunes and playing times of respective tunes, etc. This TOC data is caused to undergo management at the information management unit 15 which will be described later in detail.

The encoder 13 implements a predetermined signal processing, etc. to audio data which has been read out as stream from the disc reproducing unit 12. In more practical sense, the encoder 13 divides stream of audio data as frame to supplement frame header, tag as occasion demands.

As a compressing technique of audio data in the encoder 13, e.g., MP3 can be used. MP3 is one of compressing techniques of audio data in conformity with MPEG (Moving Picture Experts Group), and indicates MPEG1 Audio Layer 3 in formal sense. This compressing system of MP3 is characterized in that data is compressed by making use of the characteristic of auditory sense of the human being of "minimum audible limit" and "masking effect".

Figure 3:
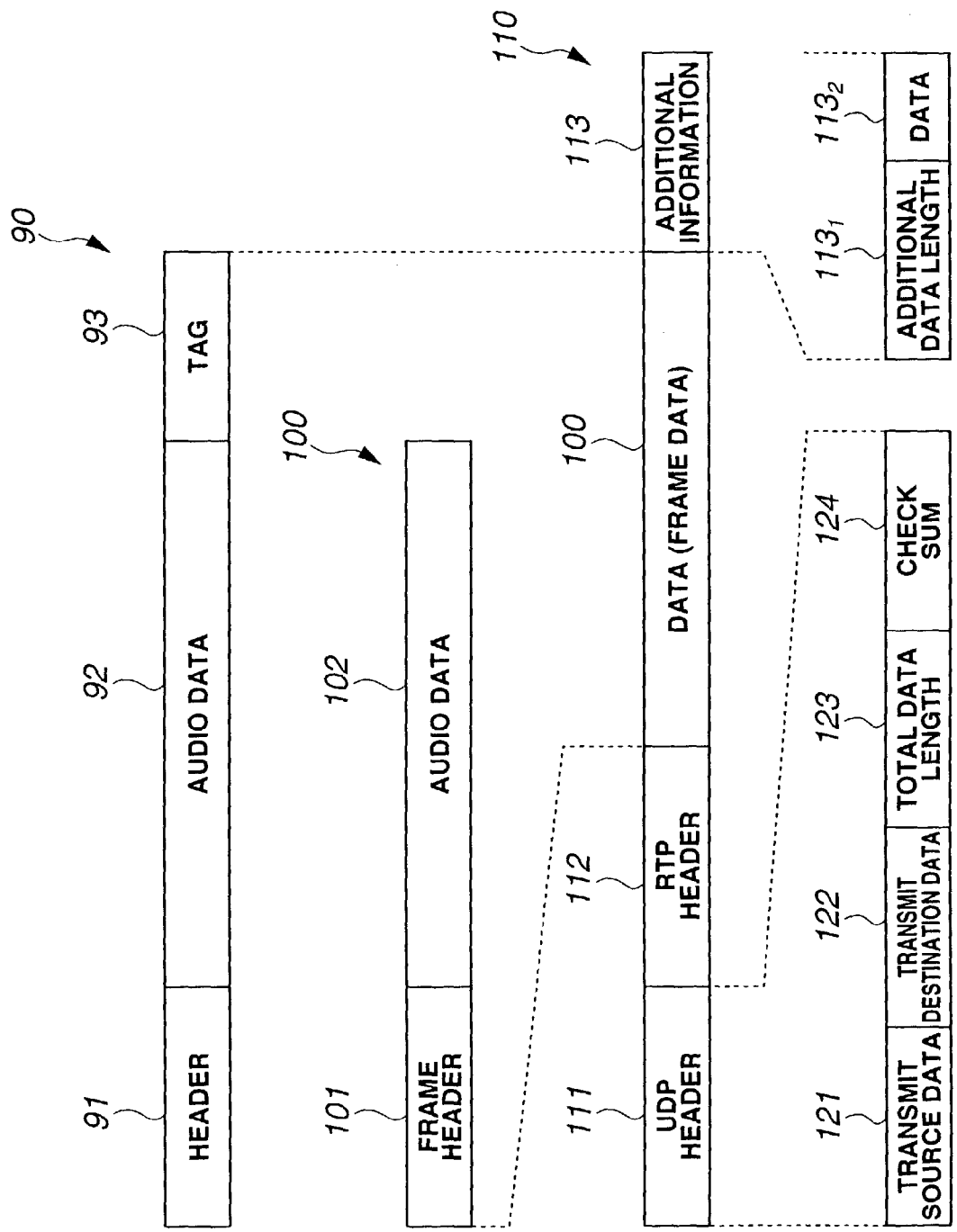
FIG. 3 is a view showing data form used between the reproduction player and the remocon of the reproducing system shown in FIG. 1.
Figure 4:
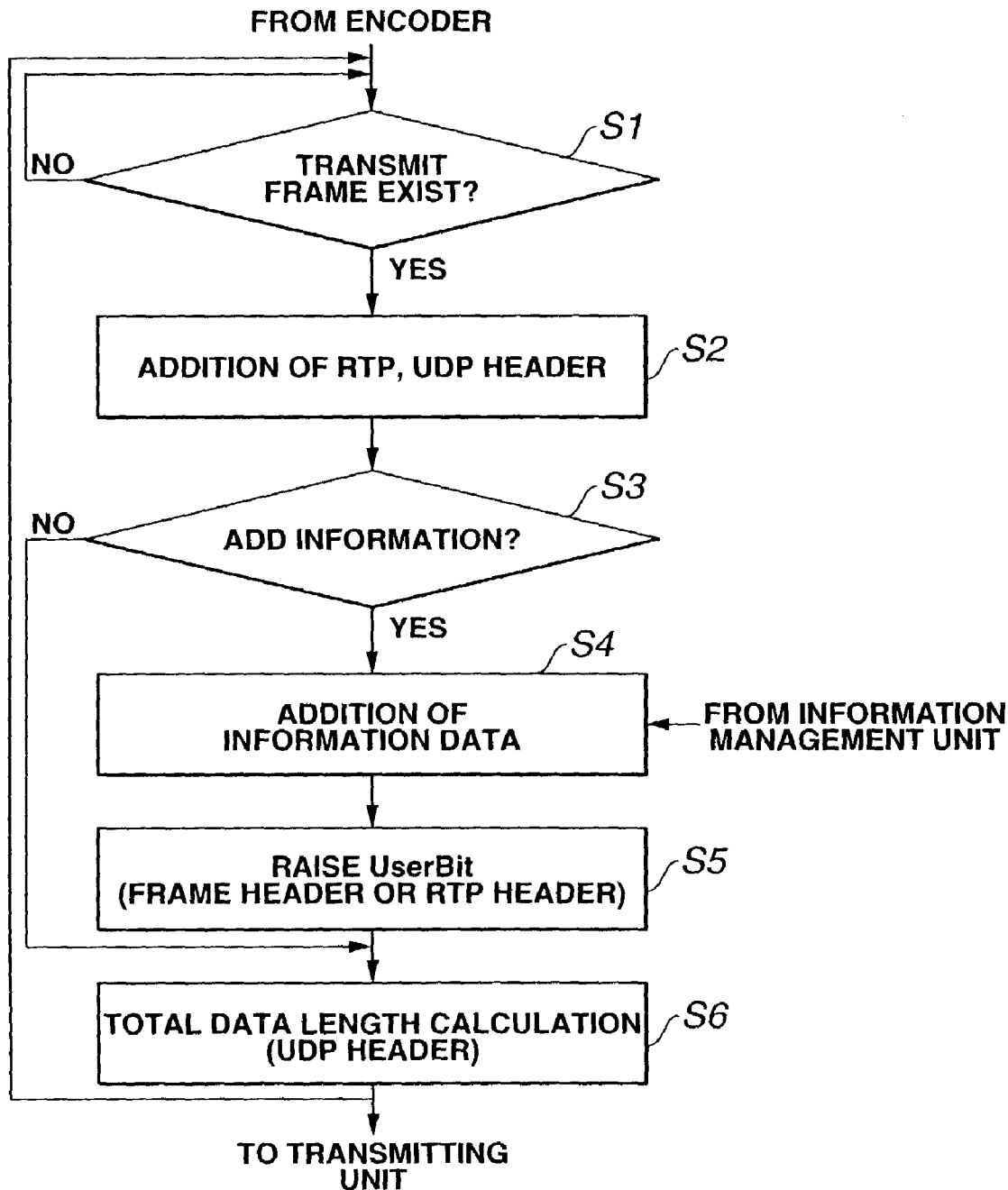
FIG. 4 is a flowchart showing an example of a series of processing at packet processing unit of the reproduction player shown in FIG. 2.

For example, in MP3, file format as shown in FIG. 3 is defined. File 90 consists of header 91, audio data 92 and Tag 93. Here, in the header 91, there are stored, e.g., codec information, etc. relating to encode system, e.g., kind of CODEC (e.g., further finely classified kind in MPEG Audio), bit rate, sampling frequency and channel mode (e.g., mode such as stereo or monaural, etc.), etc. Further, in the tag 93, there are included TOC data such as name of tune, artist name, album name, age and genre, etc.

Moreover, in the MP3, audio data of file 90 is partitioned every time to allow respective partitioned audio data caused to be in packet form to be MPEG audio frame 100 to define frame format.

In frame header 101, information of this frame 100 is inserted similarly to header 91 of file 90. For example, information of length within frame is also included. In addition, in the frame header 101, Private Bit that user can freely use is also included.

Here, information added to audio data 102 at the encoder 13 is information obtained from the information management unit 15. The information management unit 15 operates in a manner described below.

The information management unit 15 carries out management of information of TOC data which has been read out from the disc. Further, this information management unit 15 also carries out management of operating state information indicating operating state of this reproduction player 10 and/or tune reproduction information of No. etc. of track being reproduced in addition to TOC data. As the operating state information, there are mentioned information such as playback (reproduction), temporary stop and/or fast feed, etc. of the reproduction player 10 as described above.

For example, management information such as operating state information and/or tune reproduction information, etc. which are caused to undergo management by the information management unit 15 are information realized by application which operates this reproducing system, and this management information constitutes information peculiar to application.

Further, the information management unit 15 delivers various information caused to undergo management to packet processing unit 14 which will be described later. In more practical sense, the information management unit 15 sends out operating state information and tune reproduction information to the packet processing unit 14. For example, the information management unit 15 outputs these information at required timing from the packet processing unit 14.

The encoder 13 divides audio data which has been read out from the disc to output divided data to the packet processing unit 14 as frame in conformity with the above-described frame format.

The packet processing unit 14 mainly functions as a unit which adds header for carrying out data communication to frame delivered from the encoder 13. Kind of header to be added is determined in dependency upon protocol used in communication.

For example, in the case of real time streaming on internet protocol (IP), RTP (Real Time Transport Protocol)/UDP (User Datagram Protocol) is mentioned as protocol. Here, real time streaming is an operation to carry out transmission/reception of data while carrying out encode or decode operation of data.

As shown in FIG. 3, the packet processing unit 14 adds UDP header 111 and RTP header 112 to data (frame data in this example) 100 outputted from the encoder 13 to generate communication packet 110.

Here, RTP header 112 serves to give preliminary information in order to permit the receiving side of data to reproduce stream at correct order and timing. Namely, the RTP header 112 constitutes auxiliary header. In more practical sense, in the RTP header 112, there are included information such as payload type, order number (order to be reproduced) and time mark (time when reproduction is carried out), etc. The payload type is kind of codec included as data, MPEG Audio, PCM (Pulse Code Modulation), Audio, and/or the so-called G. 721, etc. In addition, in the RTP header 112, Marker Bit that user can freely use is also included.

UDP header 111 is header indispensable for carrying out communication on internet protocol. In more practical sense, in the UDP header 111, information such as transmit source data 121, transmit destination data 122, total data length 123 and/or check sum 124, etc. are included. Here, the total data length 123 indicates length of data succeeding to the UDP header 111. In addition, the check sum 124 is information for checking at the communication packet receiving side whether or not communication error takes place.

The packet processing unit 14 adds the UDP header 111 and the RTP header 112 to frame data 100 outputted from the encoder 13, and adds additional information 113 succeeding to the data 100 as shown in FIG. 3 as another processing.

Here, additional information 113 that the packet processing unit 14 adds to the frame data 100 is operating state information indicating operating state of the reproduction player 10, and is information obtained from the information management unit 15. For example, more practical form of additional information added after the frame data 100 is such that additional information length is indicated by $113_1$, and the portion succeeding thereto is caused to be data $113_2$ including header.

For example, this additional information 113 is information displayed on the display unit 22 of the remocon 20, and is information indicating track No. of tune that the reproduction player 10 is reproducing at present, title of tune, playing remaining time of tune, and/or internal state of player (e.g., playback (reproduction), double speed playback (reproduction), stop, temporary stop, etc), etc.

Moreover, in the case where additional information 113 is added to frame data 100, the reproduction player 10 also sends information indicating presence or absence of that addition to the remocon 20. In this case, the reproduction player 10 uses, e.g., Private Bit which is redundant bit within frame header 101, or Marker Bit which is redundant bit within RTP header 112.

Here, explanation will be given in connection with the case where Private Bit is used to notify presence or absence of additional information. For example, when application is implemented, such arrangement is made in advance. Thus, at the receiving side, it is possible to recognize in advance the place (portion) where information notifying presence or absence of additional information is stored.

In more practical sense, arrangement is made such that in the case where Private Bit is "1", additional information exists, and in the case where Private Bit is "0", additional information does not exist. Namely, at the receiving side, if Private Bit is "1", it is seen that additional information 113 of additional data length $113_1$ and data $113_2$ including header is added.

At step S1, the packet processing unit 14 discriminates whether or not frame data 100 is transmitted from the encoder 13. In the case where frame data 100 is delivered from the encoder 13, the packet processing unit 14 first adds UDP header 111 and RTP header 112 to the frame data 100 at step S2.

Then, at step S3, the packet processing unit 14 discriminates whether or not additional information added after the frame data 100 exists. Here, in the case where additional information added after frame does not exist, processing by the packet processing unit 14 jumps to step S6 to calculate total data length of UDP packet. In more practical sense, the packet processing unit 14 calculates sum of data lengths of RTP header 112 and frame data 100.

Moreover, in the case where information added after frame exists at the step S3, processing by the packet processing unit 14 proceeds to step S4 to add additional information (information data). In more practical sense, the packet processing unit 14 adds information to be transmitted to the remocon 20 of information caused to undergo management at the information management unit 15 to the portion after frame data 100 as shown in FIG. 3. The additional information is added to the portion after frame data 100, and actual information $113_2$ is added in a manner succeeding to additional data length $113_1$ indicating length of additional data.

At the subsequent step S5, the packet processing unit 14 raises (sets) Private Bit in the frame header 101. Namely, in the case where additional information is added after frame data, flag is raised (set). Thus, the remocon 20 serving as the receiving side of communication packet 110 can recognize additional information 113 added after frame data 100.

It is to be noted that while it is not limited that information which notifies presence or absence of additional information is realized by using Private Bit which is the so-called reserve bit as described above, such information may be also realized by using marker bit which is reserve bit provided in other area, or provided at other stage of data formation.

As described above, communication packet is formed via the packet processing unit 14. The reproduction player 10 sends out communication packet generated in this way to actual communication path through the transmitting unit 16 including the antenna 11. In the case where Bluetooth is employed, the transmitting unit 16 implements base band processing and RF processing, etc. corresponding thereto.

On the other hand, at the remocon 20, radio wave from the reproduction player 10 is received at the receiving unit 24 including the antenna 23. The receiving unit 24 carries out demodulation processing of received signal. Thus, at the receiving unit 24, data which has the same form as communication packet generated at the packet processing unit 14 of the reproduction player 10 is restored. Thereafter, the receiving unit 24 outputs data which has been caused to undergo demodulation processing to the packet processing unit 25 of the succeeding stage.

The packet processing unit 25 implements a processing for taking out frame data (or referred to as audio frame as occasion may demand) and additional information from the received communication packet. The packet processing unit 25 outputs the frame data which has been taken out to the decoder 26. In addition, the packet processing unit 25 outputs additional information which has been taken out to the information management unit 27.

Figure 5:
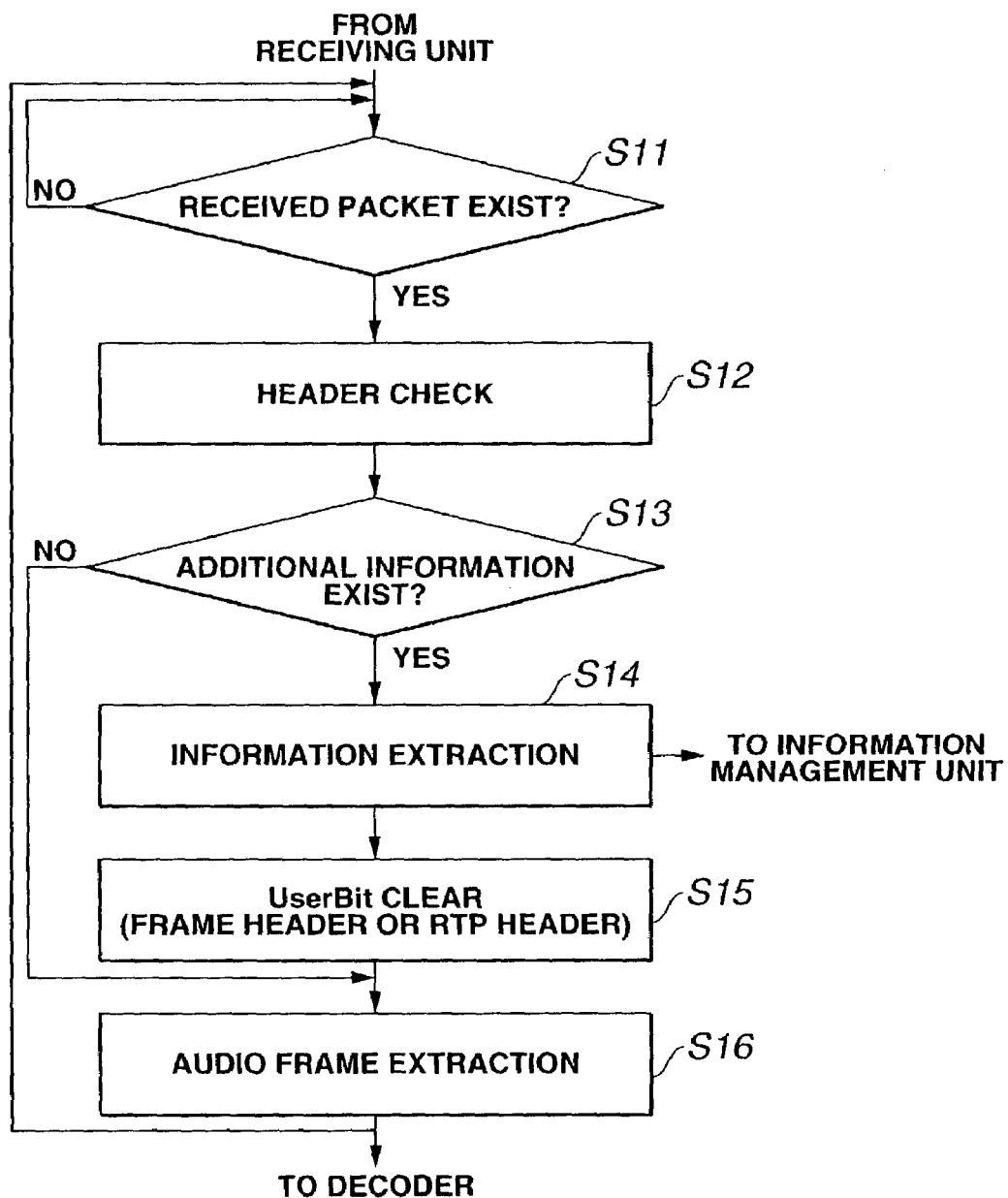
FIG. 5 is a flowchart showing an example of a series of processing at packet processing unit of the remocon shown in FIG. 2.

FIG. 5 shows a more practical example of a series of processing procedure at the packet processing unit 25.

At step S11, the packet processing unit 25 discriminates whether or not communication packet is received. In the case where communication packet is delivered from the receiving unit 24, the packet processing unit 25 checks header of communication packet at step S12. In more practical sense, the packet processing unit 25 compares total data length 123 and check sum 124 stored in UDP header 111, and RTP header 112, frame data 100 and additional information 113 succeeding thereto to examine whether or not communication is correctly carried out.

Then, the packet processing unit 25 examines order number of RTP header 112 to rearrange received communication packets so that correct order is provided when frame data 100 is reproduced at the decoder 26.

Moreover, the packet processing unit 25 examines payload type of RTP header 112 to analyse frame header 101 in accordance therewith. Thus, the packet processing unit 25 is operative so that when payload type is MPEG Audio, it judges that frame header 101 of MPEG Audio is successive after RTP header 112 to carry out corresponding processing.

At step S13, the packet processing unit 25 examines presence or absence of additional information. In more practical sense, the packet processing unit 25 examines the state of Private Bit of frame header 101 on the basis of arrangement determined in advance. It is discriminated that in the case where Private Bit is "1", additional information exits, and in the case where Private Bit is "0", additional information does not exist.

In the case where Private Bit is caused to be "1" so that additional information exists, the packet processing unit 25 extracts additional information 113 from frame data 100 at step S14.

As a technique for extracting this additional information 113, in more practical sense, the packet processing unit 25 first calculates length of frame data 100 succeeding to RTP header 112 on the basis of data included in frame header 101. Thus, start position of additional information is determined. Length of additional information is determined as difference obtained by subtracting sum of data length of frame data 100 and data length of RTP header 112 from total data length (data) 123 stored in UDP header 111.

Thus, it becomes possible to specify position of additional information 113 within communication packet 110 and that data length. For this reason, extraction of additional information 113 from frame data 100 can be made. Further, the packet processing unit 25 outputs obtained additional information 113 to the information management unit 27.

Moreover, the packet processing unit 25 extracts additional information 113 thereafter to remove RTP header 112 from the remaining data portion consisting of RTP header 112 and frame data to take out frame data 100 which is audio frame. The packet processing unit 25 outputs obtained frame data 100 to the decoder 26.

The decoder 26 decodes the frame data 100 to output it to the output unit 21. The output unit 21 serving as voice output means such as headphone, etc. outputs music decoded by the decoder 26 to the external.

Thus, additional information and/or music (tune) information, etc. are inputted to the information management unit 27. From the display unit 22, information caused to undergo management at the information management unit 27 is outputted.

For example, album name being reproduced, title of tune and playing time of tune, etc. are displayed on the display unit 22. In more practical sense, track No. of tune being reproduced, title of tune and/or playing remaining time of tune, etc. are displayed on the display unit 22 on the basis of tune reproduction information. In addition, the operating state of the reproduction player 10 such as playback (reproduction), doble speed playback (reproduction), stop and/or temporary stop, etc. is displayed on the real time basis on the basis of the operating state information.

It is to be noted that while explanation has been given in connection with the fact that reserve bit of frame header 101 or RTP header 112 is used in order to notify presence or absence of additional information to the remocon 20 serving as the receiving side, the remocon 20 may also detect presence or absence of additional information without using reserve bit.

In this case, for example, at the packet processing unit 25 in the remocon 20, difference between total data length (data) 123 included in communication packet header such as UDP header 111, etc. and frame length (data) calculated from data included in frame header 101 of frame data 100 is examined. Because this difference result indicates presence or absence of additional information, the packet processing unit 25 can examine difference of necessary data length without using reserve bit to detect presence or absence of additional information. The packet processing unit 25 carries out extraction of additional information in a manner as described above on the basis of result of presence or absence of detected additional information.

As described above, the reproducing system can output music reproduced at the reproduction player 10 from the output unit 21 such as the headphone of the remocon 20, display name of tune being reproduced, and display operating state information or tune reproduction information at the reproduction player 10 on the real time basis on the display unit 22.

Thus, the reproducing system sends additional information along with music data from the reproduction player 10, thereby making it possible to notify, to user, on the real time basis, information such as track No. of tune being reproduced, title of tune, playing remaining time, etc. and operating state of the reproduction player 10 (playback (reproduction), doble speed playback (reproduction), etc. stop, temporary stop and fast feed, etc.), etc.

Moreover, in this reproducing system, even if information that application desires to utilize is not defined within frame of music data or in header added at the time of transmission, it is possible to transmit and receive this information.

Namely, in the case where application which operates this reproducing system is provided after frame for data transmission or header added at the time of transmission is defined (such case is rather general), this invention is particularly effective.

Further, in the reproducing system, as the premise for realizing operation to which this invention is applied as described above, addition of information when header is supplemented to frame data to generate communication packet data and/or arrangement of format of technique for addition of additional information, etc. are the condition. In this case, it is possible to realize a function to transmit and receive additional information without carrying out change of basic communication protocol, change of format of frame and communication packet header, and change of basic function at the encoder 13 or the decoder 26, etc.

Namely, the reproducing system realizes, on the display unit 22 of the remocon 20, display of operating state information or tune reproduction information at the reproduction player 10 without complicating procedure and/or structure of the apparatus.

Further, when music is externally outputted from the output unit 21 of the remocon 20, frame data 100 is transmitted at all times as communication packet 110 from the reproduction player 20 to the remocon 20 so that additional information 113 is added to this frame data 100. Namely, additional information is added to frame data 100 at all times.

Further, here, addition of additional information may be carried out only as occasion demands. Namely, in a series of communication processing during reproduction of tune, there may be cases where additional information is transmitted from the reproduction player 10 to the remocon 20, and there may be cases where such additional information is not transmitted. Thus, the remocon 20 does not read out additional information at all times.

Further, while explanation has been given by taking the reproducing system for reproducing music as an example in this embodiment, it is needless to say that this invention is not limited to the reproducing system for music. For example, this invention can be also applied to systems for handling image and music. Further, this invention can be also applied to a recording system for recording information, and a recording/reproducing system for carrying out recording and reproduction.

Further, while explanation has been given by taking the example of the system in which MPEG, etc. has been already applied as protocol and explanation has been given by taking the example of Bluetooth with respect to communication in this embodiment, this invention is not limited to such implementation, but can be also applied to apparatuses or systems in which other protocol and/or communication system are employed.

In addition, explanation has been given in this embodiment in connection with the case where additional information is information indicating operating state such as playback (reproduction) or temporary stop, etc. at the reproduction player 10, this invention is not limited to such implementation. Namely, it is sufficient that, e.g., additional information is at least information which can be acquired at the reproduction player 10. In more practical sense, additional information may be information, etc. peculiar to application provided for operating this reproducing system.

INDUSTRIAL APPLICABILITY

In accordance with the reproducing system according to this invention, the reproducing unit allows reproduced music and/or video data to be packet data so that communication packet is provided, and inserts additional information into the communication packet to transmit it, and the external output unit externally outputs music and/or image on the basis of received music and video data, and can operate operating means on the basis of additional information inserted into communication packet.

The invention claimed is:

1. A reproducing system comprising:
a reproducing unit configured to reproduce content data stored in a storage medium, and
a remote control unit;
the reproducing unit comprising:
    a stream generating unit that generates a stream from the content data stored in the storage medium;
    an encoded unit that divides the stream into a frame including a frame header, wherein the frame header includes information on the length of the frame;
    a packet data generating unit configured to generate a communication packet including the frame, append additional information to the frame, and include an additional header including the total data length of the communication packet in the packet, wherein the additional information indicates at least time information corresponding to a reproduction time, and
    a transmitting unit configured to transmit the communication packet outputted from the packet data generated unit onto a communication path; and
the remote control unit comprising:
    a receiving unit configured to receive the communication packet on the communication path,
    a data taking-out configured to take out the additional information from the communication packet using the frame length information, and configured to take out the frame,
    a decoding unit for decoding the frame to produce an audio signal;
    an output unit configured to externally output the audio signal to a speaker, earphone, or headphone, and
    a display unit for displaying the reproduction time on the basis of the additional information in real time with the output audio signal after the taking of the additional information out of the communication packet using the frame length information.

2. The reproducing system as set forth in claim 1, wherein the additional information comprises at least one of operating state information relating to operation of the reproducing unit and information relating to data that the reproducing unit is reproducing.

3. The reproducing system as set forth in claim 2, wherein the display unit displays at least one of the operating state information and information relating to data that the reproducing unit is reproducing.

4. The reproducing system as set forth in claim 1, wherein the remote control unit comprises a control unit to carry out at least reproduction control of the reproducing unit.

5. The reproducing system as set forth in claim 1,
wherein the reproducing unit uses a redundant bit in which user use is permitted within the communication packet to indicate presence or absence of the additional information, and
wherein the remote control unit detects presence or absence of the additional information from the redundant bit of the communication packet to take out the additional information by the data taking-out unit on the basis of the detection result.

6. The reproducing system as set forth in claim 1,
wherein the data taking-out unit detects presence or absence of the additional information on the basis of difference of frame length information from the total data length to take out the additional information on the basis of the detection result.

7. A reproducing method comprising:
generating a stream from content data stored in a storage medium at a reproducing unit;
dividing the stream into a frame including a frame header, wherein the frame header includes information on the length of the frame;
appending additional information to the frame, wherein the additional information indicates at least time information corresponding to a reproduction time;
generating a communication packet including the frame and the additional information;
including an additional header including the total data length of the communication packet in the packet;
transmitting the communication packet onto a communication path;
receiving the communication packet transmitted on the communication path at a remote control unit;
removing the additional information from the received communication packet using the frame length information;
removing the frame from the received communication packet;
decoding the frame to produce an audio signal;
outputting an audio signal on the basis of the reproduced content data to a speaker, earphone, or headphone; and
displaying the reproduction time on the basis of the additional information in real time with the output audio signal after the taking of the additional information out of the communication packet using the frame length information.

8. The reproducing method as set forth in claim 7,
wherein the additional information comprises at least one of operating state information relating to operation of the reproducing unit and information relating to data that the reproducing unit is reproducing.

9. A data transmitting apparatus for transmitting, to a remote control unit, a communication packet such that the remote control unit can display the reproduction time on the basis of additional information in real time with an output audio signal after the additional information is taken out of the communication packet using frame length information, the data transmitting apparatus comprising:
a stream generating unit that generates a stream from the content data stored in the storage medium;
an encoding unit that divides the stream into a frame including a frame header,
wherein the frame header includes information on the length of the frame;
a packet data generating unit configured to generate the communication packet including the frame, append additional information to the frame, and include an additional header including the total data length of the communication packet in the packet, wherein the additional information indicates at least time information corresponding to a reproduction time, and
a transmitting unit configured to transmit the communication packet outputted from the packet data generating unit onto a communication path.

10. The data transmitting apparatus as set forth in claim 9,
wherein the additional information comprises at least one of operating state information relating to operation and information relating to data being reproduced.

11. The data transmitting apparatus as set forth in claim 10,
wherein the remote control unit further comprises, a display unit for displaying information, and
wherein the display unit displays at least one of the operating state information and information relating to data being reproduced.

12. The data transmitting apparatus as set forth in claim 9,
wherein the remote control unit comprises a control unit, and
wherein at least reproduction control of the reproduced content data is carried out by the control unit.

13. The data transmitting apparatus as set forth in claim 9,
wherein a redundant bit in which user use is permitted within the communication packet is used to indicate presence or absence of the additional information, and
wherein the remote control unit detects presence or absence of the additional information from the redundant bit of the communication packet to take out the additional information by the data taking-out unit on the basis of the detection result.

14. The data transmitting apparatus as set forth in claim 9,
wherein the remote control unit detects presence or absence of the additional information on the basis of difference of frame length information from the total data length to take out the additional information on the basis of the detection result.

15. A data transmitting method of transmitting, to a remote control unit, a communication packet such that the remote control unit can display the reproduction time on the basis of additional information in real time with an output audio signal after the additional information is taken out of the communication packet using frame length information, the data transmitting method comprising:
generating a stream from content data stored in a storage medium;
dividing the stream into a frame including a frame header, wherein the frame header includes the frame length information;
appending additional information to the frame, wherein the additional information indicates at least time information corresponding to a reproduction time;
generating the communication packet to include the frame and the additional information;
including an additional header to the packet including the total data length of the communication packet; and
transmitting the communication packet onto a communication path.

* * * * *